March 24, 1964 J. L. FERGUSON, JR 3,125,842
COMPRESSION APPARATUS
Filed May 23, 1960 8 Sheets-Sheet 2

INVENTOR.
John L. Ferguson Jr.
BY
Olson, Mecklenburger, von Holst,
Pendleton & Neuman United States Patent Office 3,125,842
Patented Mar. 24, 1964

3,125,842
COMPRESSION APPARATUS
John L. Ferguson, Jr., Downers Grove, Ill., assignor, by mesne assignments, to Textile Machine Works, a corporation of Pennsylvania
Filed May 23, 1960, Ser. No. 31,175
15 Claims. (Cl. 53—387)

This invention relates to a compression apparatus, and more particularly to an apparatus which will accept cartons from a carton sealing machine or gluer and will hold the flaps of the cartons under compression until the sealing medium or glue which has been applied thereto has set.

The compression device constructed in accordance with this invention is particularly adapted for use in connection with the carton sealing apparatus illustrated and described in the copending patent application Serial No. 16,905, filed February 23, 1960, and entitled "Case Sealing Apparatus," now Patent No. 3,085,376, issued April 16, 1963. The apparatus described in that application is adapted to accept cartons of various sizes fed to it in random order and to apply a sealing medium, such as glue, to the flaps of such cartons. The carton flaps are then closed and the carton is discharged preferably to a compression unit which will maintain the flaps of the cartons in their completely closed position until the sealing medium has had an opportunity to set sufficiently to prevent the flaps from springing open. Compression devices of the prior art would not work well with the versatile sealing apparatus described in application Serial No. 16,905, now Patent No. 3,085,376, issued April 16, 1963, for, to be effective, the compression device which is utilized in combination with this sealing apparatus must be as versatile as the sealing apparatus. That is, it must be smooth, efficient, dependable and fast, and it must readily adjust itself to various sizes of cartons.

In addition, quite often it is necessary to sort the sealed cartons according to size or to discharge the sealed cartons to separate conveyors. With compression devices of the prior art auxiliary sorting, collecting and storage conveyors would normally be required to accomplish these results.

It is, therefore, one object of the invention to provide a carton compression apparatus which will accommodate cartons of various sizes, fed thereto in random order.

It is another object of this invention to provide a compression apparatus which is smooth, efficient, dependable and fast and which will automatically adjust to cartons of various sizes.

It is still a further object of this invention to provide a versatile compression apparatus which defies obsolescence and speeds production by accepting cartons of various sizes from a carton sealer at random and without interruption.

It is another object of this invention to provide a versatile carton compression apparatus which is compact and permits the maximum utilization of floor space.

It is an additional object of this invention to provide a versatile, compact, efficient and completely automatic carton compression apparatus which will accept cartons of various sizes fed to it at random from a carton sealer.

It is still a further object of this invention to provide a carton compression apparatus which will eliminate the need for sorting, collecting or storing shipping cartons of similar size to effect an economic run through the machine.

It is an additional object of this invention to provide a compact versatile carton compression apparatus offering a multitude of combinations for conveying cartons therefrom not possible with compression units of previous designs.

It is still another object of this invention to provide a versatile and compact carton compression apparatus which will effect discharge of the cartons to any one of several radial discharge stations for the most efficient utilization of floor space and shipping facilities.

Other objects will be seen and a further understanding of this invention may be had by referring to the following description and claims taken in conjunction with the accompanying drawings.

The apparatus constructed in accordance with this invention is adapted to be positioned at the exit or discharge end of a carton sealing apparatus, such as that described and illustrated in the copending application Serial No. 16,905, filed February 23, 1960, now Patent No. 3,085,-376, issued April 16, 1963. The carton sealing apparatus, therein described and illustrated, is effective to apply a sealing medium, such as glue, to the upper and lower exterior carton flaps and to subsequently close these flaps. The compression apparatus accepts the cartons from the carton sealer and maintains the closed flaps under compression until the sealing medium has had an opportunity to set, thus eliminating the very great tendency of the carton flaps to spring open after they have been sealed. After the carton flaps have been under compression for a predetermined period of time, they are then discharged from the compression apparatus to a "take-off" conveyor.

The compression apparatus comprises a plurality of compression units or platen pairs, each compression unit including a fixed lower platen and a heavy movable upper platen, and the compression of the carton flaps is caused by the weight of the movable platen which merely rests upon the top of the carton. The units are arranged in an annulus, and means is provided for indexing this annulus about its axis to sequentially place the compression units in a plurality of predetermined aliquot angular positions or stations. One of these positions is the loading position wherein a carton may be received from the carton sealer, and at least one other of these predetermined positions is a discharge position wherein the carton which had been previously deposited between the platen pairs may be discharged therefrom to a "take-off" conveyor. Means is also provided for effecting movement of the cartons radially outward from between the platens in the platen pair, when that platen pair is presented in its discharge position.

Since the compression apparatus is utilized in combination with the automatic self-adjusting carton sealer, as previously described, it is preferred that means be provided for synchronizing the operation of these two units, and that means be provided for sensing the presence of a carton in the carton sealer. Means is also provided for separating the platen pairs at the loading position and at a discharge position. A control means controls the degree of separation of the platens at the loading position so that the flaps on the cartons will not be permitted to spring open when the carton is transferred from the carton sealer to the carton compression apparatus.

One of the features of this invention is the means by which the compression units or platen pairs may be indexed through their various predetermined angular positions. The platen pairs are mounted on a support member which maintains and supports them in an annulus, and a plurality of angularly spaced or positioned formations are provided on this support member. A cooperating rotatable driven disk is associated with the support member, and this driven disk has at least one driving formation thereon which will mate with the formations on the support member. The angular spacing between the formations on the support member corresponds to the angular spacing between each of the predetermined aliquot positions of the compression units, and thus for each complete rotation of the driven disk the support member and each of the compression units thereon are indexed about the axis of the support member from one aliquot angular position to another aliquot angular position. Idler formations on the driven disk cooperate with idler formations disposed between the radial formations on the support member to correctly align the compression units in one of their predetermined aliquot angular positions after these units have been indexed. The driving formations on the driven disk are preferably selectively positionable to achieve either single indexing or double indexing in either the clockwise or the counterclockwise directions.

Other features of the invention include the platen separating means which effects separation of the platens at the loading and discharge portions or stations and the carton moving means which effects movement of the carton radially outward from between the separated platens at the discharge stations. The platen separating means and the carton moving means are preferably responsive to a carton characteristic detection means at each of the discharge positions which determines whether the carton between the platens presented to that particular discharge position is of the predetermined characteristic for discharge at that position. In the preferred embodiment this carton characteristic detection means detects the height of the carton between the platens, whereby the cartons may be sorted and distributed to various take-off conveyors in accordance with the carton heights.

In the drawings, in which like parts are designated by like reference numerals, and the views are taken in the direction indicated by the arrows.

Figures 2, 3, 4:
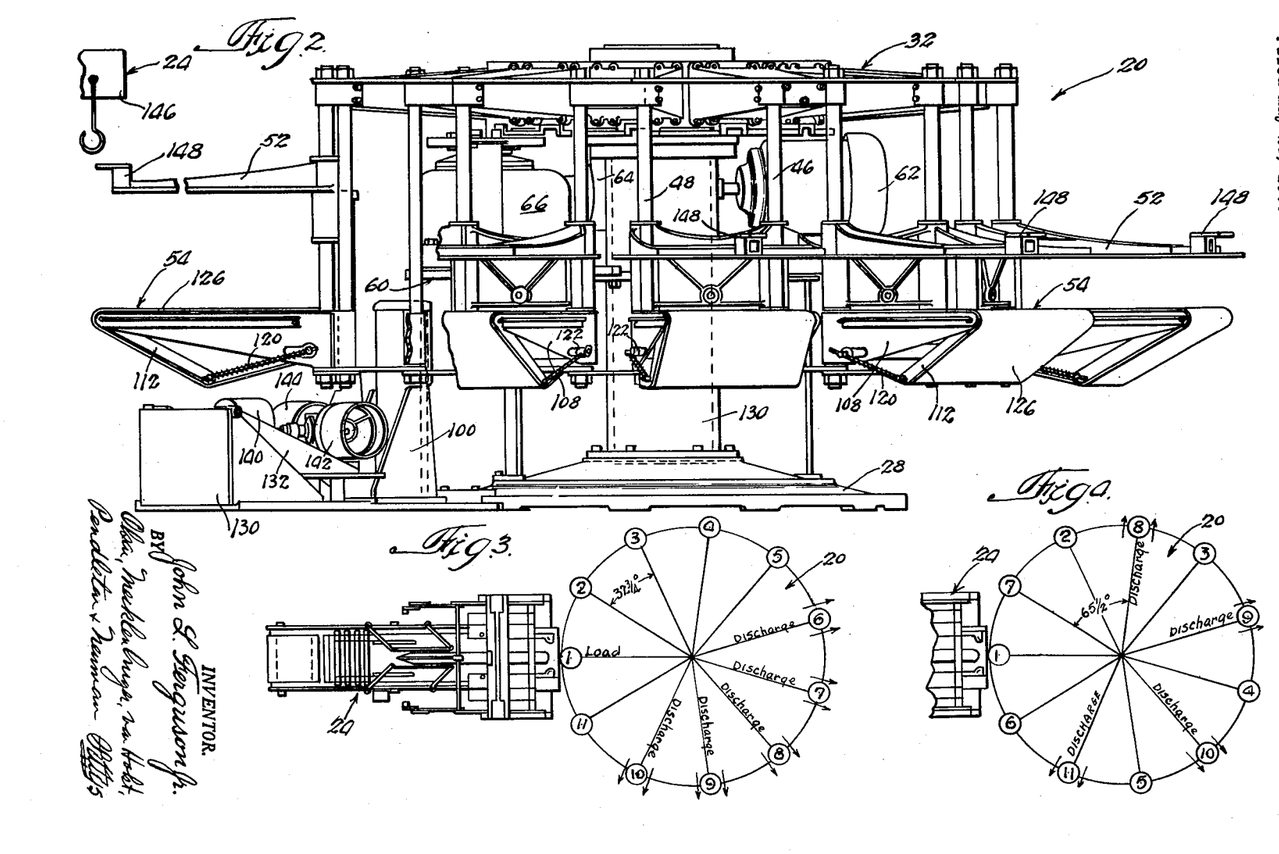
FIG. 2 is a side elevation view of the apparatus illustrated in FIG. 1.
FIG. 3 is a diagrammatic view illustrating the carton sealer and the various positions of the compression units when the compression apparatus is operated for single indexing.
FIG. 4 is a diagrammatic view illustrating the various positions of the compression units when the compression apparatus is being operated for double indexing.

With more particular reference to the drawings, the apparatus 20 constructed in accordance with this invention is adapted to receive cartons 22 which have been sealed by a carton sealer 24 (see FIG. 3). The cartons 22 are constructed of cardboard and have inner flaps and outer flaps at both the top and bottom. The sealer 24 applies glue to the outer flaps at both the top and the bottom of the carton, and then folds these outer flaps onto the already closed inner flaps. The sealer 24 may be of any type which accomplishes this result. However, the apparatus 20 is designed for and is particulaly adapted for use with a sealer, such as that illustrated in the copending patent application Serial No. 16,905, filed February 23, 1960, entitled "Case Sealing Apparatus," now Patent No. 3,085,376, issued April 16, 1963. Such a case sealer 24 is adapted to receive and continuously seal cartons of various sizes which are fed to it at random. The compression apparatus 20 is positioned immediately adjacent the exit or discharge end of the sealer 24, and it is the function of this apparatus to maintain the flaps at both the top and bottom of the carton under compression for a sufficient length of time to permit the glue, which has been applied to these flaps by the sealer 24 to set, so that the flaps will not spring open.

The apparatus 20 includes a base 28 having a hollow shaft 30 which extends vertically upward therefrom and is fixed thereto. Mounted on the upper end of the shaft 30 for pivotal movement about the axis of the shaft is a support member 32 comprising a wheel 34 and a plurality of arms 36 which are bolted to and extend radially outward from the wheel 34. There are preferably eleven such arms 36. The wheel 34 is rotatably mounted on the upper end of the vertical shaft 30 by means of angularly disposed roller bearings 38 and 40 which ride respectively in the angular roller bearing races 42 and 44 extending about the shaft 30. The wheel 34 and the arms 36 of the support member 32 are suitably reinforced by means of webs and braces, and each arm 36 has a pair of rods 46 and 48 fixed to the ends thereof and vertically depending therefrom. Mounted on these depending rods are the compression units 50 which comprise a heavy movable upper platen 52 and a fixed lower platen 54. The flaps of the carton 22 are kept under compression by the weight of the upper platen 52 which rests thereon. In the preferred embodiment there are eleven such compression units, each being mounted between two of the adjacent arms 36 on a rod 46 depending from one of the arms and on a rod 48 depending from the adjacent arm.

Figure 7:
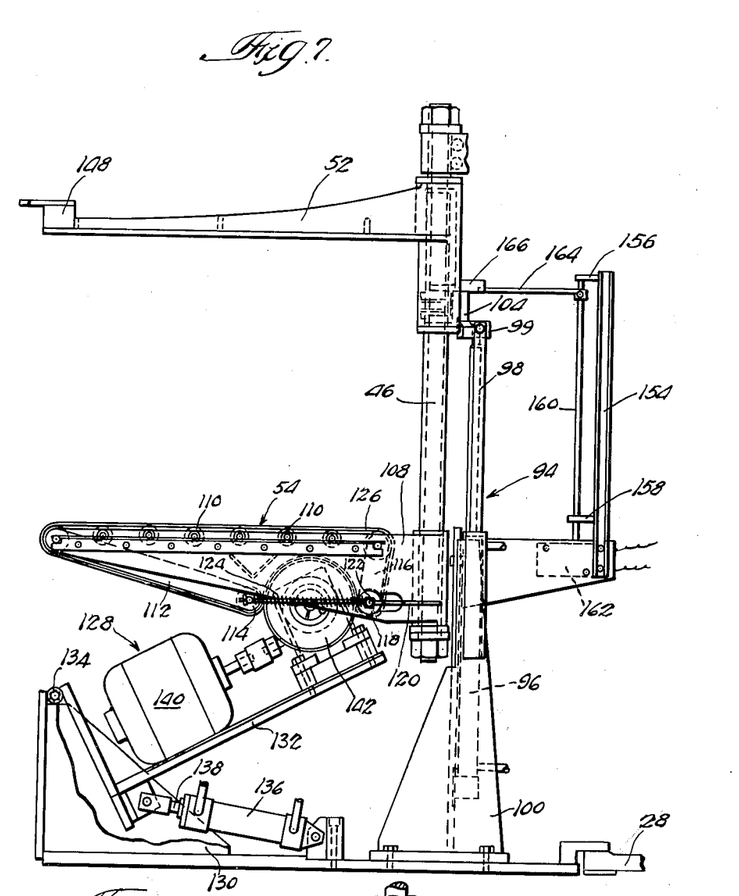
FIG. 7 is a sectional elevation view taken substantially along line 7—7 of FIG. 1 and illustrating the mechanism for discharging a carton from the compression units at one of the discharge positions.
Figure 8:
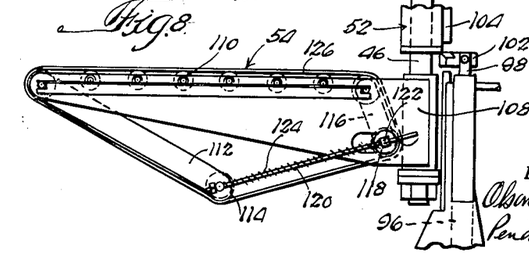
FIG. 8 is an elevation view of the lower platen of one of the compression units showing this platen at one of the discharge positions prior to the raising of the upper platen.

The lower platen 54 of each compression unit 50 is fixed to the lower end of the rods 46 and 48 depending from the support member 32, and the upper platen 52 of each compression unit is slidably movable on rods 46 and 48 between a fully lowered position, as illustrated in FIG. 8, and a fully raised position, as illustrated in FIG. 7. Thus, the upper platen 52 of each of the platen pairs 50 is movable in the vertical direction toward and away from the lower platen 54, and the eleven compression units 50 are indexed with this support member 32 about the axis of the fixed vertical shaft 30. It will be understood that the vertical shaft 30 could be fixed to the support member 32 and pivotally attached to the base, in which case it would be indexed with support member 32 about its axis.

The eleven compression units 50 are indexed about the axis of the shaft 30 through eleven different predetermined angular positions or stations which are disposed approximately apart 32¾° in the case of single indexing, and approximately 65½° in the case of double indexing, as best illustrated in FIGS. 3 and 4, respectively. In the case of single indexing each compression unit 50 is moved to the position which was occupied by the immediately adjacent compression unit, whereas in the case of double indexing each compression unit is moved through the position which was occupied by the immediately adjacent unit into the position which was occupied by the next adjacent unit. In single indexing each compression unit 50 may be filled and discharged during each complete revolution of the compression unit annulus. However, in double indexing each unit 50 may be filled and discharged only once during every two complete revolutions of the compression unit annulus.

Each time the support member 32 with the compression units 50 mounted thereon is indexed, each of the eleven compression units is presented in a different position about the axis of the shaft 30. One of the positions or stations of the compression units 50 is a loading station, and when in this position a compression unit is aligned with the sealer 24 and is adapted to receive a carton therefrom. At least one of the other predetermined positions or stations is a discharge station, and when in this position a compression unit 50 is adapted to discharge a carton therefrom.

Figure 5:
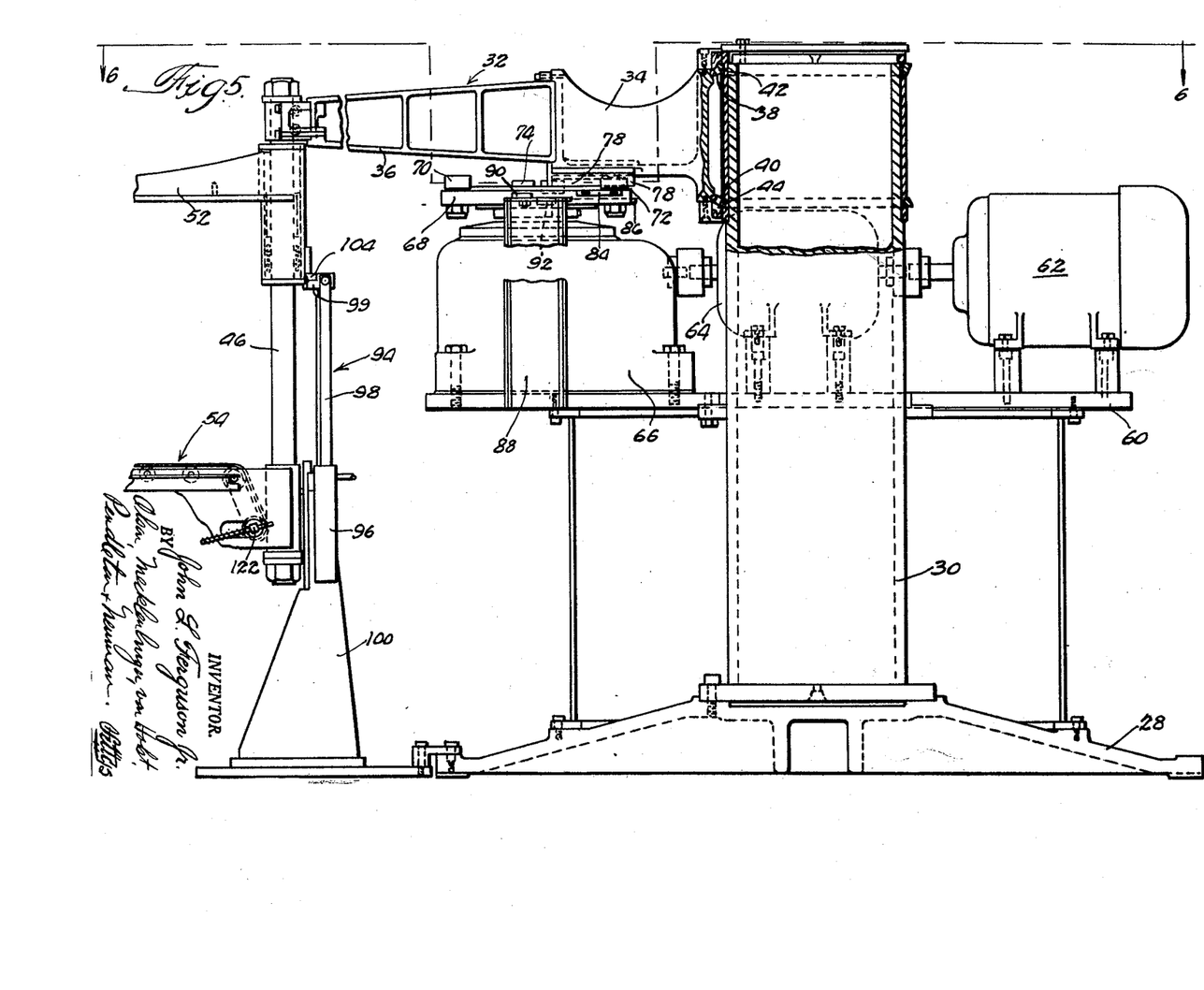
FIG. 5 is a sectional elevation view taken substantially along line 5—5 of FIG. 1 and illustrating the indexing mechanism and the carton characteristic detection means.
Figure 6:
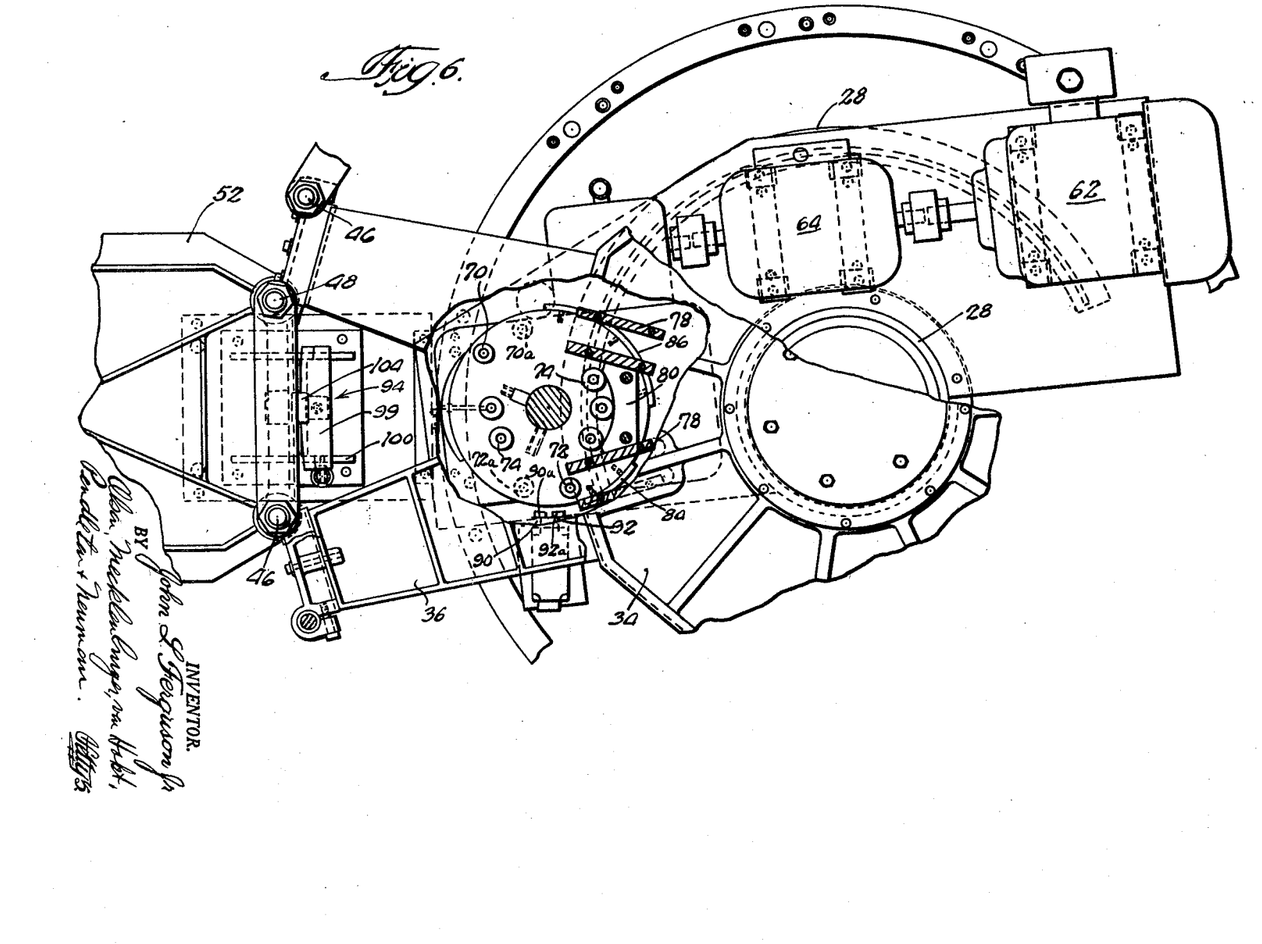
FIG. 6 is a sectional plan view taken substantially along line 6—6 of FIG. 5.

The mechanism for indexing the support member 32 and the compression units 50 is best illustrated in FIGS. 5 and 6. Fixed to shaft 30 and to base 28 is a platform 60 on which is mounted a motor 62, a clutch brake mechanism 64 and a reducer 66. Keyed on the vertical output shaft 66a of the reducer is a driven member or disk 68 on which may be mounted two removable drive rolls 70 and 72 and a plurality of removable idler rolls 74. As will be more fully described herein, the drive rolls 70 and 72 may be removed individually or repositioned in other holes in the driven disk 68 to provide for single indexing or double indexing of the compression units 50 in either the clockwise or counterclockwise directions. The idler rolls 74 are also easily removed or repositioned, for the same reason.

Mounted on the underside of the support wheel 34 and depending therefrom are eleven slotted guide fixtures 78. The fixtures 78 are disposed with their slots, which operate as raceways, extending radially with respect to the axis of the wheel 34, and each fixture is aligned with the center line of a respective arm 36 of the support member 32. Also mounted on and depending from the wheel 34 are eleven concave idler formations or dwell blocks 80 each disposed intermediate an adjacent pair of the slotted guide fixtures 78. The slots or raceways in the guide fixtures 78 are sufficiently wide to accommodate the drive rolls 70 and 72 on the driven disk 68, and the radius of convexity of the dwell blocks 80 is approximately equal to the radius of the circle generated by the movement of the outermost portions of the idler rolls 74 about the pivotal axis of the driven disk 68; that is to say, the arc of the idler dwell blocks 80 is generated from the pivotal axis of the driven disk 68. The disk 68 is driven by the motor 62 through the clutch brake mechanism 64 and the reducer 66. The motor 62 is a bidirectional A.C. motor, and the direction in which this motor is operated determines the direction in which compression units 50 are indexed, i.e., clockwise or counterclockwise. The drive rolls 70 and 72 are illustrated in FIG. 6 in position for double indexing in the clockwise direction. To achieve single indexing in the clockwise direction drive roll 72 is removed and drive roll 70 is moved to the dotted line position 70a. To achieve single indexing in the counterclockwise direction the drive roll 72 remains as illustrated, and the drive roll 70 is merely removed. To achieve double indexing in the counterclockwise direction drive roll 70 is moved to its dotted line position 70a and drive roll 72 is moved to its dotted line position 72a. Each time the driven member 68 is rotated through 360°, the support member 32 and the compression units 50 mounted thereon are indexed from one angular position to the next. This indexing is accomplished by the sequential movement of the drive rolls 70 and 72 into the slotted guide fixtures 78. Each time one of these guide rolls 70 or 72 is moved into and engages in these slotted fixtures, the support member 32 is rotated with the driven member 68 through an angle of approximately 32¾° which is about one-eleventh of a complete circle or 360°. If there is only one drive roll 70 or 72 on the driven disk 68, only one of the slotted fixtures 78 will be engaged, and the support member 32 and the compression units 50 will be indexed from one position to the adjacent position through an angle of approximately 32¾°. If, however, there are two drive rolls 70 and 72 on the driven disk 68, as is illustrated in FIG. 6, then the drive rolls will enter consecutively or sequentially into the adjacent slotted guide fixtures 78, and the support member 32 and each of the compression units 50 will be thus indexed through an angle of approximately 65½° which is twice the angle of single indexing.

After the support member 32 and the compression units 50 have been thus indexed, the idler rolls 74 which follow the drive rolls 70 and 72 move into and sweep through the concavity in the adjacent dwell block 80. If the support member 32 and the compression units 50 are not precisely aligned in one of their predetermined positions, the dwell block 80 will not be in correct position. However, the movement of the idler rolls against this concave dwell block 80 will cause the support member 32 and the compression units 50 to be cammed into their correct alignment. Thus, the idler rolls 74 in combination with each of the dwell blocks 80 serve to accurately align the support member 32 and the compression units 50 in their positions after indexing. In addition, the disposition of the idler rolls 74 within the concavity of one of the dwell blocks 80 serves to maintain the compression units in proper position until the next indexing cycle is begun.

Mounted on the periphery of the driven disk 68 and centered approximately 90° about the axis thereof from one another are two thin, curved, barlike cams 84 and 86. The cam 84 is mounted adjacent the top surface of the driven disk 68, and the cam 86 is disposed adjacent the bottom surface of the driven disk 68. Mounted on a bracket 88 which extends upwardly from the fixed platform 60 are two switches 90 and 92. The operating button 90a of the switch 90 is disposed slightly above the operating button 92a of switch 92, thus the switch 90 is operated by cam 84 on the driven disk 68, and the switch 92 is operated by the cam 86. The function and operation of the switches 90 and 92 will be hereinafter more fully described.

Figure 9:
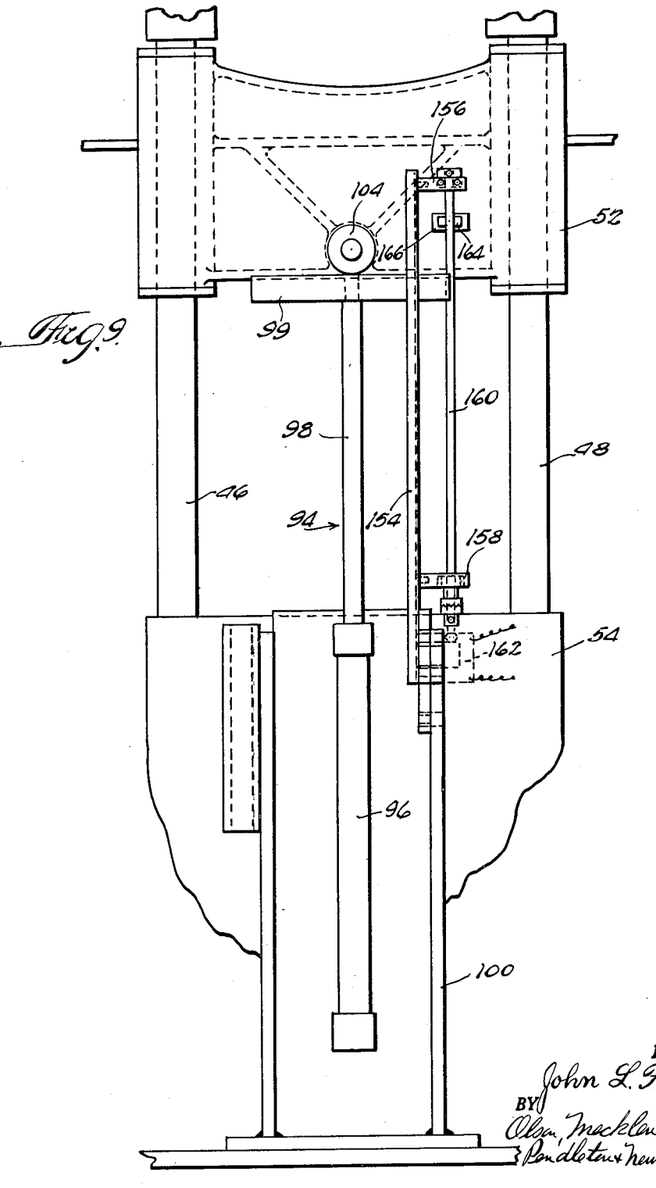
FIG. 9 is a sectional elevation view taken substantially along line 9—9 of FIG. 1 and showing the relationship between one of the compression units and the detection means for detecting the height of the carton therein.

At each discharge position of the compression units 50 there is located a mechanism 94 for effecting the raising of the upper platen 52. One such mechanism 94 is illustrated in FIGS. 7, 8 and 9, and this mechanism comprises a hydraulic cylinder 96 having a reciprocally movable operating rod 98 at the end of which is disposed a platen engaging fixture 99. The hydraulic cylinder 96 is mounted on a bracket 100 fixed to the base 28 of the apparatus at the particular discharge position, and the entire mechanism 94 is disposed within the annulus of compression units 50, i.e., within the circle generated by the innermost portions of the compression units 50 in their indexing movement about the axis of shaft 30. The fixture 99 on the end of the operating rod 98 is adapted to engage a protuberant, inwardly extending formation 104 provided on each of the upper platens 52. When hydraulic pressure is applied to the cylinder 96 in a direction to cause upward movement of the operating rod 98, the fixture 99 mounted thereon will be moved into engagement with the inwardly extending, protuberant portion 104 on the upper platen 52 of the compression unit presented in that discharge position, and the platen 52 will be moved upwardly away from the lower platen 54. This releases the carton between the platens so that it may be readily discharged. Each of the mechanisms 94 remains fixed with respect to the base 28 of the apparatus in its particular discharge position, and the platen pairs or compression units 50 are moved relative thereto to sequentially present different compression units to these discharge positions where the upper platen 52 may be raised by the mechanisms 94.

The means for effecting the movement of the carton outwardly from between the platens is also illustrated in FIGS. 7 and 8. The lower platen 54 of each compression unit 50 comprises a pair of parallel arms 108 (see FIG. 1) having a plurality of freely rotatable support rolls 110 extending transversely therebetween. The parallel arms 108 extend horizontally outward from and are attached to the rods 46 and 48 which vertically depend from the support member 32. These arms 108 with the support rolls 110 extending therebetween form a flat fixed base for supporting a carton. Pivotally mounted at and depending from the outer end of the parallel arms 108 is another pair of parallel arms 112 which carry a transverse idler roller 114 adjacent their free ends, and a third pair of parallel arms 116 is pivotally mounted adjacent the inner ends of and depends from the arms 108. A transverse idler roller 118 is carried by the arms 116 adjacent their free ends. A pair of rods 120 pivotally mounted at the free ends of the parallel arms 112 extend through a pair of apertured end fixtures 122 which are fixed to the free ends of the two parallel arms 116, and a pair of springs 124 coiled about the rods 120 act between the free ends of the parallel arms 112 and apertured fixtures at the free ends of the parallel arms 116 to urge the free ends of these arms and the rollers 114 and 118 apart. An "endless" conveyor belt 126 extends over the support rolls 110 on the arms 108 and under the idler rolls 114 and 118 on the ends of the pivotally depending pairs of parallel arms 112 and 116, respectively. The springs 124 in urging the rollers 114 and 118 apart serve to maintain the belt 126 tightly positioned across the support rolls 110. The belt 126 may be freely moved by virtue of its contact with the freely rotatable rolls 110, 114 and 118, and thus the carton may be readily moved onto the lower platen 54 by the sealer 24. As the carton is moved onto the belt 126 by the sealer 24, the belt will freely rotate in the clockwise direction, as viewed in FIGS. 7 and 8. The carton is firmly supported on the belt 126 by the support rolls 110.

A mechanism 128 is provided at each of the discharge stations or positions to drive the belt 126 in the opposite direction, i.e., counterclockwise, as viewed in FIGS. 7 and 8, to effect radial discharge of the carton from between the platens 52 and 54. Mounted in fixed position with respect to the base of the apparatus 28 at each of the discharge positions is a mounting bracket 130, and a movable platform 132 is connected to this mounting bracket 130 by means of a hinge 134. The movable platform 132 may be moved relative to the mounting bracket 130 about the horizontal axis of the hinge 134 by means of a reciprocally movable operating rod 138 which is attached to the piston of a hydraulic cylinder 136. The hydraulic cylinder 136 itself is connected in fixed position with respect to the bracket 130, and as the operating rod 138 is moved inwardly the platform 132 is moved from its retracted position illustrated in FIG. 2 to the raised position illustrated in FIG. 7.

Figure 1:
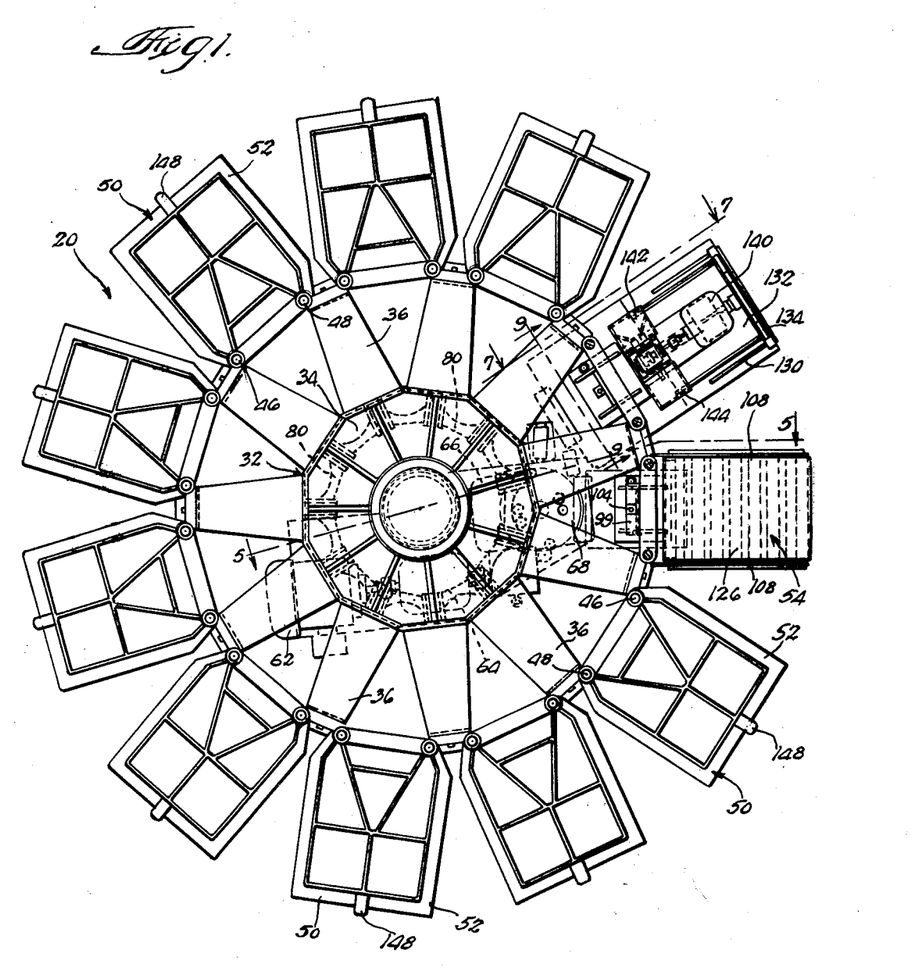
FIGURE 1 is a top plan view of the apparatus constructed in accordance with this invention.

Mounted on the movable platform 132 is a motor 140 which is operatively connected to and is adapted to rotate a pair of horizontally disposed drum rolls 142 and 144 (see FIG. 1). The drum rolls 142 and 144 are so positioned on the platform 132 that when the platform is raised by the action of hydraulic cylinder 136 to the position illustrated in FIG. 7, these drum rolls will engage the conveyor belt 126 on the lower platen 54 of the compression unit presented at that discharge station. The drum rolls 142 and 144 of the drive mechanism 128 will move into the area between the idler rolls 114 and 118 carried at the free ends of the pairs of parallel arms 112 and 116, respectively. As the drum rolls 142 and 144 are moved upwardly into this driving position, as illustrated in FIG. 7, the conveyor belt 126 is stretched tightly over these drum rolls and under the idler rolls 114 and 118, and the idler rolls are moved inwardly toward each other against the resistance of the coil springs 124. This causes a very tight frictional engagement between motor driven drum rolls 142 and 144 and the freely movable belt 126. The drum rolls 142 and 144 are rotated by the motor 140 in the clockwise direction, as illustrated by the arrows in FIG. 7, and this effects rotation of the conveyor belt 126 in the counterclockwise direction as also indicated by arrows. A carton deposited on the belt 126 by the sealer 24 would thus be moved outwardly, to the left in FIG. 7, from between the platens 52 and 54.

The hydraulic cylinder 136 is connected to the same line as the hydraulic cylinder 96 operating the mechanism 94 which lifts the upper platen 52 of the compression unit 50. Thus, when the compression unit arrives at the discharge position, hydraulic pressure may be simultaneously applied to cylinders 96 and 136 to effect the simultaneous lifting of the upper platen 52 and of the drive mechanism 128. The conveyor belt 126 on the lower platen 54 will, therefore, be set in motion after the upper platen 52 has been raised from the carton, and the carton will be thereby discharged from between the platens.

At each of the discharge positions or stations there is present a mechanism 94 for lifting the upper platen 52 and a mechanism 128 for effecting movement of the conveyor belt 126. However, at the loading station or position, only the mechanism 94 is needed, for the sealer will effect movement of the carton onto the freely movable conveyor belt 126 without the aid of the drive mechanism 128. In order to prevent any chance of the flaps of the carton 22 from opening during the transfer of the carton from the sealer 24 to the apparatus 20, however, it is very desirable that the upper platen 52 be raised only a sufficient amount to accommodate the carton. If cartons of one particular height were being sent through the case sealer and deposited in the compression apparatus 20, there would be no great problem, for a mechanical adjustment could be made to limit the stroke of the operating rod 98 to insure that the upper platen 52 would be raised only a sufficient amount to accommodate the carton. However, where cartons of various heights are being fed into the sealer 24 and then transferred to the compression apparatus 20, means must be provided for detecting the height of the carton and for relaying this information to the mechanism 94 effecting the lifting of the upper platen 52 at the loading position. For this purpose, a pendulum switch 146 may be mounted on the adjustable platform of the sealer 24 at the discharge end thereof, and a protuberant switch actuating formation 148 may be provided on the outer extremity of the upper platen 52 of each of the compression units 50. Since the sealer 24 must be adjusted to the proper height of the carton, this height adjustment effects simultaneous height adjustment of the pendulum switch 146, and when the upper platen 52 is moved upwardly away from the lower platen 54, by the mechanism 94, the upward movement of this platen will continue until the formation 148 on the tip of the upper platen 52 engages the pendulum switch 146. The pendulum switch 146 operates a valve controlling the application of hydraulic fluid to the cylinder 96 of the upper platen lifting mechanism 94. Thus, the upper platen 52 will be raised only sufficiently to accommodate the carton which is being discharged from the sealer 24. Each time the sealer 24 is adjusted to accommodate a carton of different height, the pendulum switch 146 is moved correspondingly, and the upper platen 52 can only be raised up into engagement with this switch and no further.

At each of the discharge stations, there may be provided a mechanism 150 for detecting a predetermined physical characteristic of the carton disposed between the platens in each compression unit 50. In the preferred embodiment this carton characteristic detection mechanism 150 detects the height of the carton and, it controls the application of hydraulic pressure to both the cylinder 96 operating the upper platen lifting mechanism 94 and cylinder 136 operating the drive mechanism 128 which effects movement of the conveyor belt 126 on the lower platen 54. By means of the height detection mechanism 150 the cartons may be separated according to height and moved onto separate corresponding "take-off" conveyors. Each of the mechanisms 150 is mounted on the same mounting bracket 100 which holds the upper platen lifting mechanism 94 at that position and, thus the mechanism 150 is also disposed within the compression unit annulus.

This detection mechanism 150 includes an upwardly extending support member 154 having two vertically spaced, horizontally extending brackets 156 and 158 mounted thereon. A square, vertically disposed shaft 160 is journalled in the brackets 156 and 158, and the lower end of the shaft 160 is connected to a switch 162.

Slidably mounted on the square shaft 160 is a horizontal trip arm 164 which may be vertically positioned on the shaft 160 in accordance with the height of the carton which is to be discharged at that particular discharge position or station. Connected to and extending radially inward from the upper platen 52 is an indicating protuberance 166, which when horizontally aligned with the trip arm 164 on the shaft 160 will engage and rotate this trip arm. Rotation of the trip arm 164 causes corresponding rotation of the shaft 160 about its axis and results in the actuation of the switch 162. Since the position of the upper platen 52 is indicative of the height of the carton between the platens 52 and 54, the trip arm 164 may be adjustably positioned on the shaft 160 for engagement by the protuberance 166 on the upper platen 52 when a carton of the desired height is disposed between the platens. Thus, when a carton of such height is disposed between the platens of the compression unit presented in that discharge position, the protuberance 166 will engage the trip arm 164 to actuate the switch 162 and operate the upper platen lifting mechanism 94 and the belt drive mechanism 128 at that position.

Figure 10:
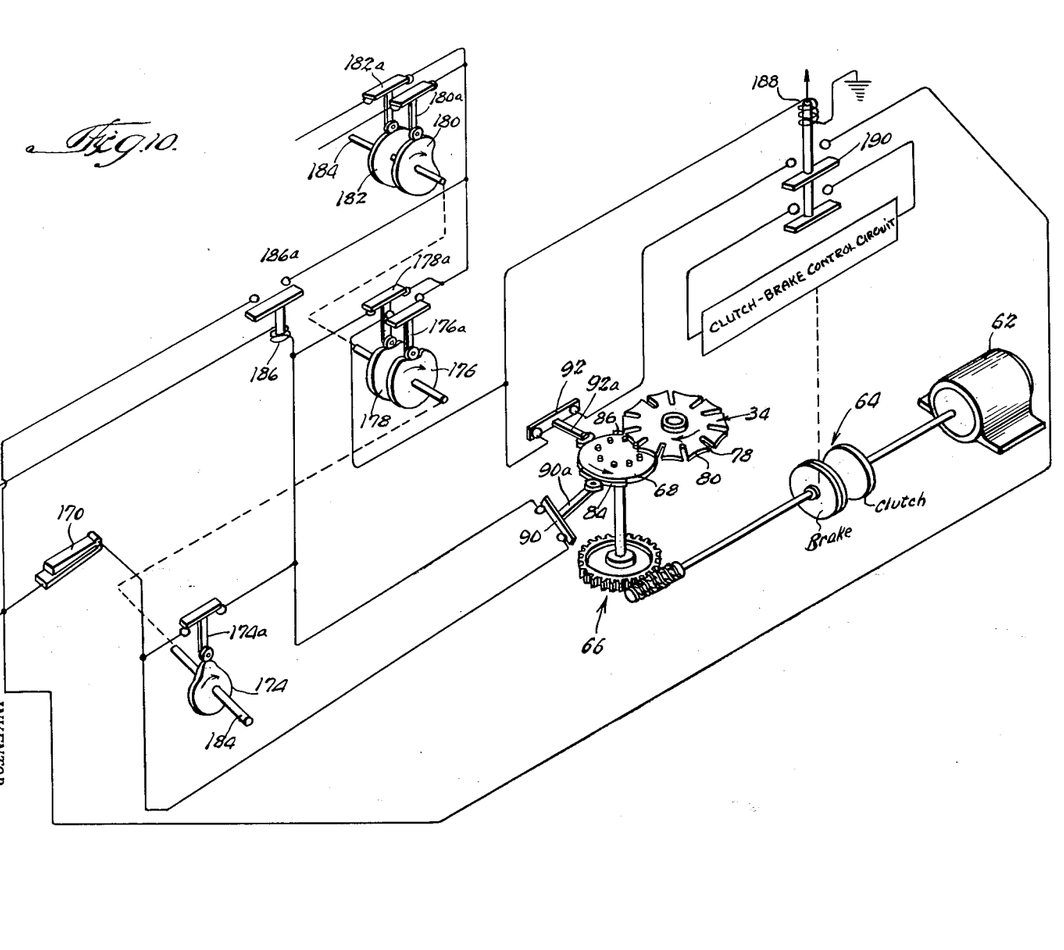
FIG. 10 is a diagrammatic illustration of the electrical circuit which may be employed in the apparatus.

Since the compression apparatus 20 is operated in conjunction with the sealer 24, means in the form of a switch 170 is provided on the sealer for determining the presence of a carton in the sealer (see FIG. 10). If there is no carton in the sealer 24, the switch 170 will remain open and accordingly the upper platen 52 will not be raised, the conveyor belt 126 on the lower platen will not be moved, and the compression units 50 will not be indexed. The cams 174, 176, 178, 180 and 182 which operate cam switches 174a, 176a, 178a, 180a and 182a, respectively, are all mounted on a single shaft 184, the rotation of which is synchronized with the conveyor on the sealer 24. These cams may actually be located in the sealer 24, if desired. The carton sensing switch 170 and the cam switch 174a are connected in series between the 110 A.C. line supply and a relay 186 which operates a cycle control switch 186a. When the relay 186 is energized and the cycle control switch 186a is closed, the circuit is completed to a cam switch 176a controlling the indexing of the apparatus 20 and to cam switches 180a and 182a controlling the operations of the upper platen raising mechanisms 94 and the belt drive mechanisms 128.

In the indexing circuit controlled by cam switch 176a is a relay 188 which when energized closes a switch 190 to operate the clutch brake mechanism 64 and begin the rotation of the driven disk 68. The motor 62 is operated continuously, but power is transmitted from this motor to the reducer 66 only when switch 190 is closed and the clutch brake mechanism 64 is energized. The clutch brake mechanism is normally in its braking position preventing the operation of the reducer 66 and the rotation of the driven member 68. When switch 190 is closed, however, the clutch brake mechanism 64 is actuated to release the brake and clutch in the reducer 66, thereby effecting rotation of the disk 68 and indexing of the compression units 50. The normally closed cam switch 92 operated by the cam 86 on the driven disk 68 completes a hold circuit for the relay 188, whereby the relay 188 will remain energized after the cam switch 176a has opened and until the switch 92 is opened.

In the loading and discharge circuit controlled by cam switches 180a and 182a there are three electrically operated solenoid valves 194, 196 and 198 which operate in the hydraulic circuit between the hydraulic pump 200 for the apparatus and the cylinders which operate the platen lifting mechanisms 94 and the belt drive mechanisms 128. Valve 194 is disposed between the pump 200 and the hydraulic cylinder 96 of the upper platen lifting mechanism 94 which is mounted at the loading station in alignment with the sealer 24. This valve which is capable of three positions is normally in an "off" position. When a voltage is applied to this valve 194 through the cam switch 180a and the pendulum switch 146, the hydraulic fluid is permitted to flow between that valve and the cylinder 96 in the direction indicated by the arrows. This causes upward movement of the operating rod 98 to effect upward movement of the upper platen 52 at the loading position. This upward movement is terminated when the upper platen raises to trip open the pendulum switch 146. The third position of the valve 194 is accomplished by applying a voltage to this valve through the cam switch 182a, and in this third position the hydraulic fluid is applied to and returned from the cylinder 96 in the direction opposite that indicated by the arrows and thus, the operating rod 96 is moved downwardly permitting the top platen 52 to be moved downwardly under its own weight into engagement with the carton 22.

Figure 11:
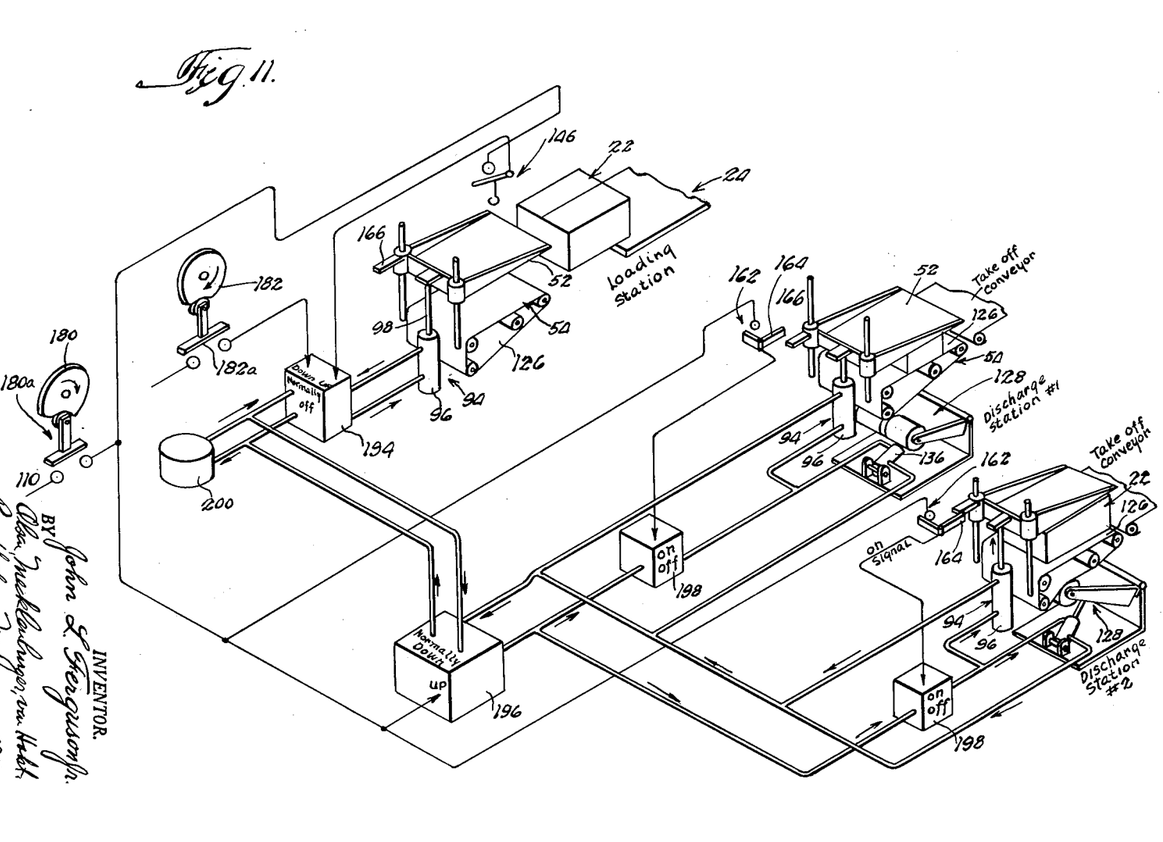
FIG. 11 is a diagrammatic illustration of the electrical and hydraulic system which may be utilized to separate the platens and effect the movement of the cartons from between the platens at a discharge station.

The valve 196 is disposed in the hydraulic line between the pump 200 and the hydraulic cylinders 96 of the platen lifting mechanisms 94 which are disposed at the various discharge positions or stations of the compression units 50. In FIG. 11 two such discharge stations are illustrated. It will be noted that at each discharge station the operating cylinder 96 of the platen lifting mechanism 94 is connected to the operating cylinder 136 in the mechanism 128 which drives the conveyor belt 126 on the lower platen 54 at that station, and these cylinders 96 and 136 are connected to the valve 196 through the discharge control valve 198.

Valve 196 is a two directional valve which in its normal position permits the hydraulic fluid to flow through it to the platen lifting mechanisms 94 and the belt drive mechanisms 128 in the direction opposite that indicated by the arrows to maintain these mechanisms in their retracted positions. However, when a voltage is applied to the valve 196 through the cam switch 180a, the valve is actuated in the opposite direction so that fluid is permitted to pass through the valve 196 in the direction indicated by the arrows, and if the control valve 198 at one of the discharge stations is open, the hydraulic fluid will be applied to operate the lifting mechanism 94 and the belt drive mechanism 128 at that station. The valve 198 is a normally closed valve which is actuated to an "open" position upon the application of a voltage thereto through the switch 162 of the carton height detection mechanism 150. When the carton 22 in the compression unit 50 presented in the discharge position is at the predetermined height for discharge, as illustrated by the second discharge station in FIG. 11, the switch 162 will be closed. Then, when the cam switch 180a is closed, the valve 196 and the discharge control valve 198 will both be actuated and hydraulic fluid will flow to the lifting mechanism 94 and to the drive mechanism 128 in the direction indicated by the arrows, which will result in upward movement of the platen 52 and upward movement of the drive mechanism 128 into engagement with the conveyor belt 126 on the lower platen 54. At those stations in which the carton between the paltens is the wrong height for discharge, as is the case at the first discharge station in FIG. 11, the switch 162 will not be closed, and the valve 198 will not be opened, therefore, the upper platen 52 of that compression unit will not be raised, and the conveyor belt 126 on the lower platen 54 will not be driven to effect discharge of the carton from that compression unit.

The operation of the apparatus 20 may be described as follows:

At the proper time in the cycle of the apparatus 20 when a carton 22 is detected in the sealer 24 the switch 170 is closed to energize the relay 186 and close the cycle control switch 186a. Cam switch 180a is closed and the valves 194 and 196 are actuated to effect raising of the platens at the loading and discharge stations or positions and to effect driving of the conveyor belts 126 on the lower platens 54 at the discharge stations. The normally closed discharge control valve 198 at each discharge station prevents discharge when the carton in the compression unit 50 is of the wrong height for discharge at that station. When the cam switch 180a is opened and the cam switch 182a is closed, the platen lifting mechanisms 94 and the belt drive mechanisms 128 are retracted.

At this point in the cycle of the apparatus the cam switch 176a (see FIG. 10) is closed to energize the relay coil 188 of the switch 190. The switch 190 closes two circuits: one circuit is a hold circuit through the switch 92 and the relay 188, and the other is a circuit which energizes the clutch brake mechanism 64 to effect release of the brake and operation of the clutch so that power may be applied from the motor 62 continuously operating through the brake clutch mechanism 64 to the reducer 66 and to the driven disk 68.

As the disk 68 is rotated the cam rolls 70 and 72 are moved consecutively into engagement with the slotted fixtures 78 on the support member 32 and the compression units 50 are double indexed through an angle of approximately 65½°. The idler rolls 74 next sweep into the dwell block 80 at that position to correctly align the compression units 50 in their predetermined angular positions. Single or double indexing of the compression units 50 in either the clockwise or counterclockwise directions is controlled by the number and arrangement of the drive rolls 70 and 72 on the driven disk 68 and by the connections to the bidirectional A.C. drive motor 62. The driven disk 68 is rotated through 360° until the cam 86 thereon opens the switch 92. This de-energizes relay 188 and opens the switch 190 controlling the brake clutch mechanism 64, permitting the clutch to release and the brake to again be applied to stop the rotation of the driven disk 68.

The cam switch 174a prevents the untimely energizing of the cycle start relay 186 which energizes the cycle start switch 186a. If for some reason, switch 170 were accidentally tripped at the wrong time—for example, during the sequence of operations of the cam switches 180a, 182a and 176a—nothing would happen, because the cam switch 174a would be opened. The normally open switch 90 is in parallel with cam switch 174a and is operated by means of the cam 84 on the driven disk 68. Switch 90 serves to prevent the relay 186 from dropping switch 186a out if cartons are being continuously moved through the sealer and tripping switch 170. Thus, if the driven disk 68 is rotating at the time when switch 174a is cammed open, the circuit is shunted by the switch 90 which is closed by the cam 84, and the relay switch 186a is prevented from dropping out.

One of the distinct advantages of the apparatus described herein is that cartons may be discharged radially to several different take-off conveyors, and the cartons may be sorted according to height. Also, when the apparatus 20 is arranged for single indexing by the arrangement of a single drive cam on driven member 68, each of the compression units 50 is moved through eleven different positions during each complete revolution, as illustrated in FIG. 3. The first of these positions is a loading position, and it will be noted that there are five different discharge positions (denoted by arrows) which can be utilized.

If the apparatus 20 is arranged for double indexing, as previously described, each of the compression units 50 will be indexed through eleven different positions, every two complete revolutions thereof about the shaft 30, as best illustrated in FIG. 4. In double indexing there are four discharge positions (denoted by the arrows). If the compression units 50 are indexed in the counterclockwise direction, the discharge positions will be symmetrically opposite that indicated in FIGS. 3 and 4.

It may be seen that the apparatus constructed in accordance with this invention is extremely versatile and will accept cartons of different dimensions fed at random from the carton sealer. The device will effect discharge of these cartons to various take-off conveyors, and if desired, the cartons may be separated by the apparatus according to carton characteristics such as height. Means, of course, could be provided to separate the cartons according to width, color or even weight, if such was desired, as will be understood by those skilled in the art.

Although the invention has been described with a certain degree of particularity, it is understood that the present disclosure has been made only by way of example and that many modifications and changes in various details may be resorted to without departing from the spirit and scope of the invention, as hereinafter claimed.

What is claimed is:

1. A compression apparatus for receiving cartons from a carton sealer, for maintaining the carton flaps under compression for a predetermined period of time and for subsequently discharging the cartons to a conveyor, said apparatus including a base having a shaft, a support member mounted on said shaft for rotation about the axis of said shaft, a plurality of individual compressing platen pairs mounted on said support member in an annulus about said shaft, one platen in each pair being mounted in fixed position with respect to said support member and the other platen of each pair being relatively movable toward and away from said fixed platen, said movable platen being urged toward said fixed platen to effect compression of the flaps of the carton disposed therebetween, said fixed platen having conveyor means thereon movable in one direction to receive a carton and in the opposite direction to discharge a carton, means for sequentially indexing said support member and said platen pairs about the axis of said shaft through a plurality of predetermined angular positions, one of said predetermined positions being a loading position wherein a carton may be received from the carton sealer and at least one other of said predetermined positions being a discharge position wherein a carton may be discharged to the conveyor, means for effecting movement of said movable platen away from said fixed platen when the platen pair is presented in the loading position and again when the platen pair is presented in a discharge position, and means for effecting movement of said conveyor means on a fixed platen of a platen pair in said opposite direction to discharge a carton therefrom after said platen pair has been presented in a discharge position and the platens have been separated.

2. A compression apparatus for receiving cartons from a carton sealer, for maintaining the carton flaps under compression for a predetermined period of time and for subsequently discharging the carton to a conveyor, said apparatus including a base having a shaft, a support member mounted on said shaft for rotation about the axis of said shaft, a plurality of individual compressing platen pairs mounted on said support member in an annulus about said shaft, one platen in each pair being mounted in fixed position with respect to said support member and the other platen of each pair being mounted above said fixed platen for relative movement toward and away therefrom, said movable platen being urged toward said fixed platen to effect compression of the flaps of the carton therebetween, said fixed platen having conveyor means thereon movable in one direction to receive a carton and in the opposite direction to discharge a carton, means for sequentially indexing said support member and said platen pairs about the axis of said shaft through a plurality of predetermined angular positions, one of said predetermined positions being a loading position wherein a carton may be received from the carton sealer and at least one other of said predetermined positions being a discharge position wherein a carton may be discharged to the conveyor, means for effecting movement of said movable platen away from said fixed platen when the platen pair is presented in the loading position and again when the platen pair is presented in a discharge position, drive means connected to said base for movement from a retracted position to an extended position in operative engagement with said conveyor means after said platen pair has been presented in a discharge position and the platens have been separated, whereby said drive means is effective to move said conveyor means in said opposite direction to discharge a carton.

3. The structure recited in claim 2 wherein the conveyor means on said fixed platen includes a continuous belt, and said drive means includes a rotatable member adapted to frictionally engage said belt when said drive means is in its extended position.

4. A compression apparatus for receiving cartons from a carton sealer, for maintaining the carton flaps under compression for a predetermined period of time and for subsequently discharging the carton to a conveyor, said apparatus including a base having a shaft, a support member mounted on said shaft for rotation about the axis of said shaft, a plurality of individual compressing platen pairs mounted on said support member in an annulus about said shaft, one platen in each pair being mounted in fixed position with respect to said support member and the other platen of each pair being mounted above said fixed platen for relative movement toward and away therefrom, said movable platen being urged toward said fixed platen to effect compression of the flaps of the carton therebetween, said fixed platen having a conveyor belt thereon movable in one direction to receive a carton and in the opposite direction to discharge a carton, means for sequentially indexing said support member and said platen pairs about the axis of said shaft through a plurality of predetermined angular positions, one of said predetermined positions being a loading position wherein a carton may be received from the carton sealer and at least one other of said predetermined positions being a discharge position wherein a carton may be discharged to the conveyor, belt drive means having a rotatable member adapted to frictionally engage said conveyor belt, discharge detection means for detecting a physical characteristic of a carton between the platen pair presented in a discharge position, and means responsive to said discharge detection means for effecting movement of said movable platen away from said fixed platen and for effecting movement of the rotatable member of said belt drive means into frictional engagement with said conveyor belt when a carton is present in the platen pair presented in the discharge position, whereby the carton may be released and said belt may be moved in a direction to effect discharge of the carton.

5. The structure of claim 4 wherein said belt drive means is mounted on said base in alignment with each of said predetermined angular discharge positions.

6. A compression apparatus for receiving cartons from a carton sealer, for maintaining the carton flaps under compression for a predetermined period of time and for subsequently discharging the cartons to a conveyor, said apparatus including a plurality of individual compressing platen pairs operatively interconnected and disposed in an annulus, means for sequentially indexing said platen pairs through a plurality of predetermined angular positions about the axis of the annulus, one of said predetermined positions being a loading position wherein a carton may be received from the carton sealer and several of said other predetermined positions being discharge positions wherein a carton may be discharged from the platens, carton characteristic detection means for detecting at least one predetermined characteristic of the carton disposed between the platens of a platen pair presented to said discharge positions, and carton moving means responsive to said carton characteristic detection means for effecting movement of the carton radially outward from between the platens in the platen pair when the carton held by the platen pair presented in discharge position has the predetermined characteristic.

7. The structure of claim 6 wherein a carton characteristic detection means and a carton moving means are provided for each of the several predetermined discharge positions, and each of said carton moving means is responsive to its corresponding carton characteristic detection means to effect movement of the carton radially outward from between the platens only when the carton therebetween has the predetermined characteristic.

8. A compression apparatus for receiving cartons from a carton sealer, for maintaining the carton flaps under compression for a predetermined period of time and for subsequently discharging the cartons to a conveyor, said apparatus including a plurality of individual compressing platen pairs operatively interconnected and disposed in an annulus, means for sequentially indexing said platen pairs through a plurality of predetermined angular positions about the axis of the annulus, one of said predetermined positions being a loading position wherein a carton may be received from the carton sealer and several of said other predetermined positions being discharge positions wherein a carton may be discharged from the platens, carton height detection means at each of the several discharge positions for detecting whether the carton disposed between the platens of a platen pair presented in that position is of a predetermined height, and carton moving means at each of the several discharge positions, each of said carton moving means being responsive to the carton height detection means at that discharge position for effecting movement of the carton radially outward from between the platens in the platen pair presented in that discharge position only when the carton is of the predetermined height.

9. A compression apparatus for receiving cartons from a carton sealer, for maintaining the carton flaps under compression for a predetermined period of time and for subsequently discharging the cartons to a conveyor, said apparatus including a base having a shaft, a support member mounted on said shaft for rotation about the axis of said shaft, a plurlaity of individual compressing platen pairs operatively interconnected and disposed in an annulus, means for sequentially indexing said support member and said platen pairs about the axis of said shaft through a plurality of predetermined angular positions, one of said predetermined positions being a loading position wherein a carton may be received from the carton sealer and at least one other of said predetermined positions being a discharge position wherein a carton may be discharged to the conveyor, means for separating the platens in each pair when the platen pair is presented in the loading position and again when the platen pair is presented in a discharge position, means for effecting movement of the carton from between the platens in the platen pair after the platen pair has been presented in a discharge position and the platens thereof have been separated, and control means for controlling the degree of separation of the platens in the platen pair presented in the loading position in accordance with the height of the carton to be loaded, whereby the flaps of the carton will not be permitted to open as the carton is loaded.

10. A compression apparatus for receiving cartons from a carton sealer, for maintaining the carton flaps under compression for a predetermined period of time and for subsequently discharging the cartons to a conveyor, said apparatus including a plurality of individual compressing platen pairs operatively interconnected and disposed in an annulus, means for sequentially indexing said platen pairs through a plurality of predetermined angular positions about the axis of said annulus, one of said predetermined positions being a loading position wherein a carton may be received from the carton sealer and several of said other predetermined positions being discharge positions wherein a carton may be discharged from the platens, means for separating the platens in each pair when the platen pair is presented in the loading position, control means for limiting the degree of separation of the platens in the loading position in accordance with the height of the carton to be loaded, whereby the flaps of the carton will not be permitted to open as the carton is loaded, carton height detection means at each of the several discharge positions for detecting whether the carton disposed between the platens of a platen pair presented in that position is of a predetermined height, and carton moving means at each of the several discharge positions, each of said carton moving means being responsive to the carton height detection means at that discharge position for effecting movement of a carton radially outward from between the platens in the platen pair presented in that discharge position only when the carton is of the predetermined height.

11. A compression apparatus for receiving cartons from a carton sealer, for maintaining the carton flaps under compression for a predetermined period of time and for subsequently discharging the cartons to a conveyor, said apparatus including a base having a shaft, a support member mounted for rotation about the axis of said shaft, a plurality of individual compressing platen pairs mounted on said support member in an annulus about said shaft, said support member having a plurality of radial formations and idler cavities arranged alternately and spaced angularly about the axis thereof, the angular spacing between said radial formations corresponding to the angular spacing between each of the aliquot positions of said support member, a rotatable driven member having at least one driving formation and at least one idler formation thereon, said driving formation being adapted to mate with the radial formations on said support member, whereby for each complete rotation of said driven member said support member and said platen pairs are indexed about the axis of said shaft from one aliquot angular position to another aliquot angular position, said idler formation being adapted to sweep through an idler cavity in said support member after said support member and said platen pairs have been indexed, whereby said platen pairs may be correctly aligned in one of their predetermined aliquot angular positions, one of the angular positions of said platen pairs being a loading position wherein a carton may be received from the carton sealer and at least one other of said angular positions being a discharge position wherein a carton may be discharged to the conveyor, means for separating the platens in each pair when the platen pair is presented in the loading position and again when the platen pair is presented in a discharge position, and means for effecting movement of the carton from between the platens in the platen pair after the platen pair has been presented in a discharge position and the platens thereof have been separated.

12. The structure of claim 11 wherein there are two driving formations on said rotatable driven member, whereby for each complete revolution of said driven member said platen pairs are indexed from one angular position through a second angular position and into a third angular position.

13. The structure of claim 12 wherein means is provided for removably attaching at least one of the two driving formations to said rotatable driven member, whereby said platen pairs may be indexed alternatively through or into an adjacent position.

14. A compression apparatus for receiving cartons from a carton sealer, for maintaining the carton flaps under compression for a predetermined period of time and for subsequently discharging the cartons to a conveyor, said apparatus including a plurality of individual compressing platen pairs operatively interconnected and disposed in an annulus, means for sequentially indexing said platen pairs through a plurality of predetermined angular positions about the axis of said annulus, one of said predetermined positions being a loading position wherein a carton may be received from the carton sealer and at least one other of said predetermined positions being a discharge position wherein a carton may be discharged to the conveyor, sensing means for sensing the presence of a carton in the carton sealer, timer control means responsive to said sensing means for signalling the start of a cycle of the apparatus, first timing means responsive to said timer control means for effecting separation of the platens in each pair when the platen pair has been presented in the loading position and in a discharge position and for effecting movement of the carton radially outward from between the platens in the platen pair presented in a discharge position, and second timing means responsive to said timer control means for actuating of said indexing means.

15. A compression apparatus for receiving cartons from a carton sealer, for maintaining the carton flaps under compression for a predetermined period of time and for subsequently discharging the cartons, said apparatus including a plurality of individual, operatively interconnected, compressing platen pairs, means for sequentially indexing said platen pairs through a plurality of predetermined positions, one of said positions being a loading position wherein a carton may be received between the platens from the carton sealer, and several of said other positions being unloading positions wherein a carton may be discharged from between the platens, carton characteristic detection means for detecting at least one predetermined characteristic of the carton disposed between the platens of a platen pair presented to said unloading positions, and carton moving means responsive to said carton characteristic detection means for effecting movement of the carton from between the platens of the platen pair when the carton held by the platen pair, presented in unloading position, has the predetermined characteristic.

References Cited in the file of this patent

UNITED STATES PATENTS

| | | |
|---|---|---|
| 1,393,122 | Heinrichs | Oct. 11, 1921 |
| 1,410,352 | Walker | Mar. 21, 1922 |
| 2,324,401 | Kimball | July 13, 1943 |
| 2,670,027 | Gigler | Feb. 23, 1954 |
| 2,744,373 | Hull et al. | May 8, 1956 |
| 2,828,593 | Colgren et al. | Apr. 1, 1958 |
| 2,904,941 | Midnight | Sept. 22, 1959 |